United States Patent [19]
Hanawa et al.

[11] Patent Number: 5,269,007
[45] Date of Patent: Dec. 7, 1993

[54] RISC SYSTEM CAPABLE OF SIMULTANEOUSLY EXECUTING DATA INTERLOCKED SHIFT AND ARITHMETIC/LOGIC INSTRUCTIONS IN ONE CLOCK CYCLE BY BYPASSING REGISTER

[75] Inventors: Makoto Hanawa, Kokubunji; Tadahiko Nishimukai, Sagamihara, both of Japan

[73] Assignee: Hitachi, Ltd., Tokyo, Japan

[21] Appl. No.: 609,408

[22] Filed: Nov. 5, 1990

[30] Foreign Application Priority Data

Nov. 8, 1989 [JP] Japan .................. 1-288874

[51] Int. Cl.⁵ .................................. G06F 9/38
[52] U.S. Cl. .................. 395/375; 364/259.5; 364/263; 364/259.2; 364/947.6; 364/948.3; 364/947.2; 364/DIG. 1; 395/800
[58] Field of Search .................. 395/375, 800

[56] References Cited

U.S. PATENT DOCUMENTS

| | | | |
|---|---|---|---|
| 4,476,525 | 10/1984 | Ishii | 364/200 |
| 4,639,866 | 1/1987 | Loo | 364/200 |
| 4,734,852 | 3/1988 | Johnson et al. | 364/200 |
| 4,766,566 | 8/1988 | Chuang | 364/900 |
| 4,858,105 | 8/1989 | Kuriyama et al. | 364/200 |
| 4,916,606 | 4/1990 | Yamaoka et al. | 364/200 |
| 4,928,226 | 5/1990 | Kamada et al. | 364/200 |
| 5,041,968 | 8/1991 | Yamaguchi | 364/200 |
| 5,073,855 | 12/1991 | Staplin et al. | 395/375 |

Primary Examiner—Parshotam S. Lall
Assistant Examiner—Ken S. Kim
Attorney, Agent, or Firm—Fay, Sharpe, Beall, Fagan, Minnich & McKee

[57] ABSTRACT

First and second instructions are simultaneously fetched from a memory to be respectively decoded by first and second instruction decoders. An instruction execution unit includes a register file, an arithmetic and logic unit, and a shifter. A first comparator compares a destination field of the first instruction with a first source field of the second instruction. The shifter produces an output in association with immediate data of the first instruction, the output being ordinarily stored in a register file. However, when both inputs of the comparator are identical to each other, the output from the shifter is supplied to an input of the arithmetic and logic unit via a bypass signal transmission path.

6 Claims, 10 Drawing Sheets

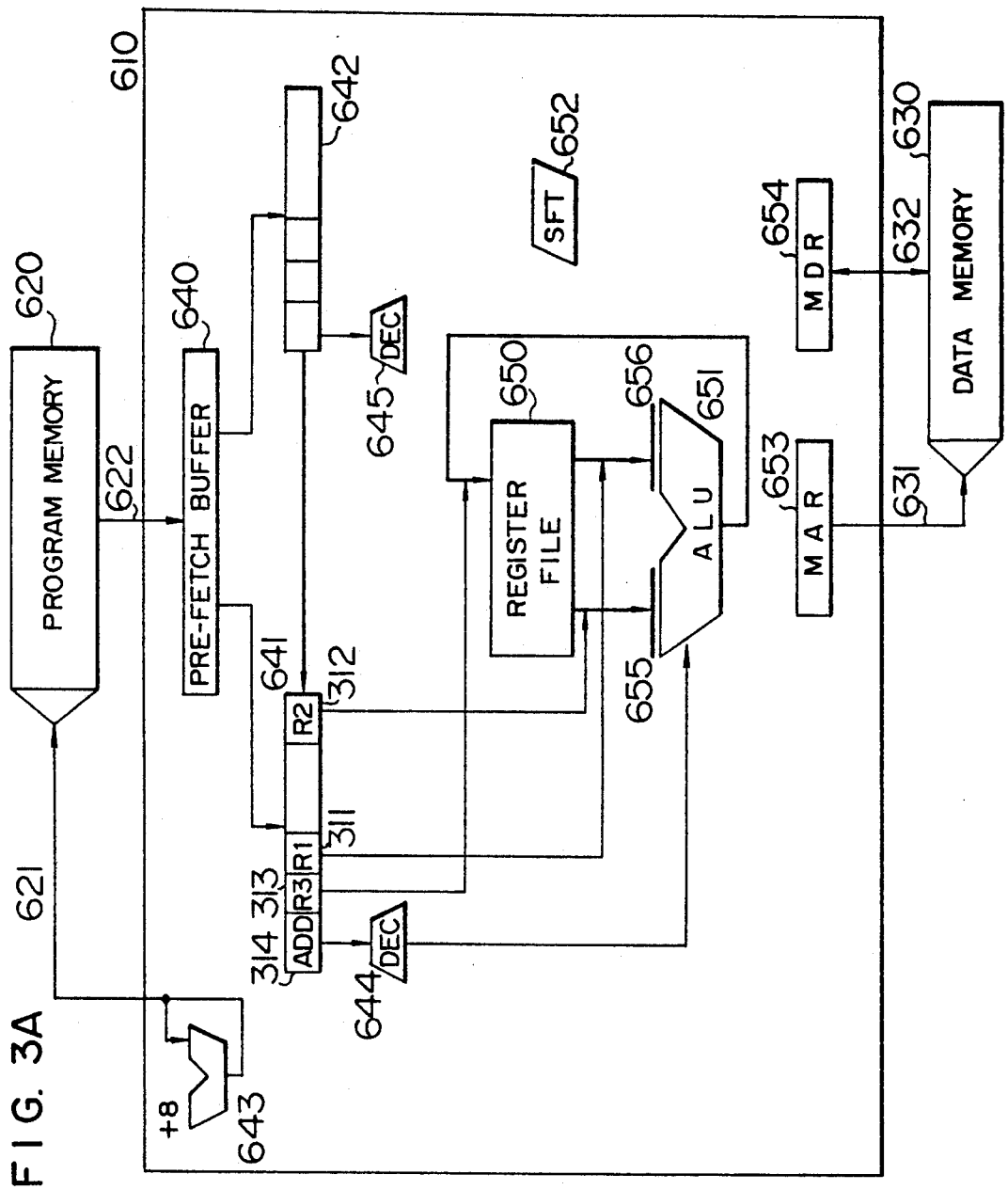

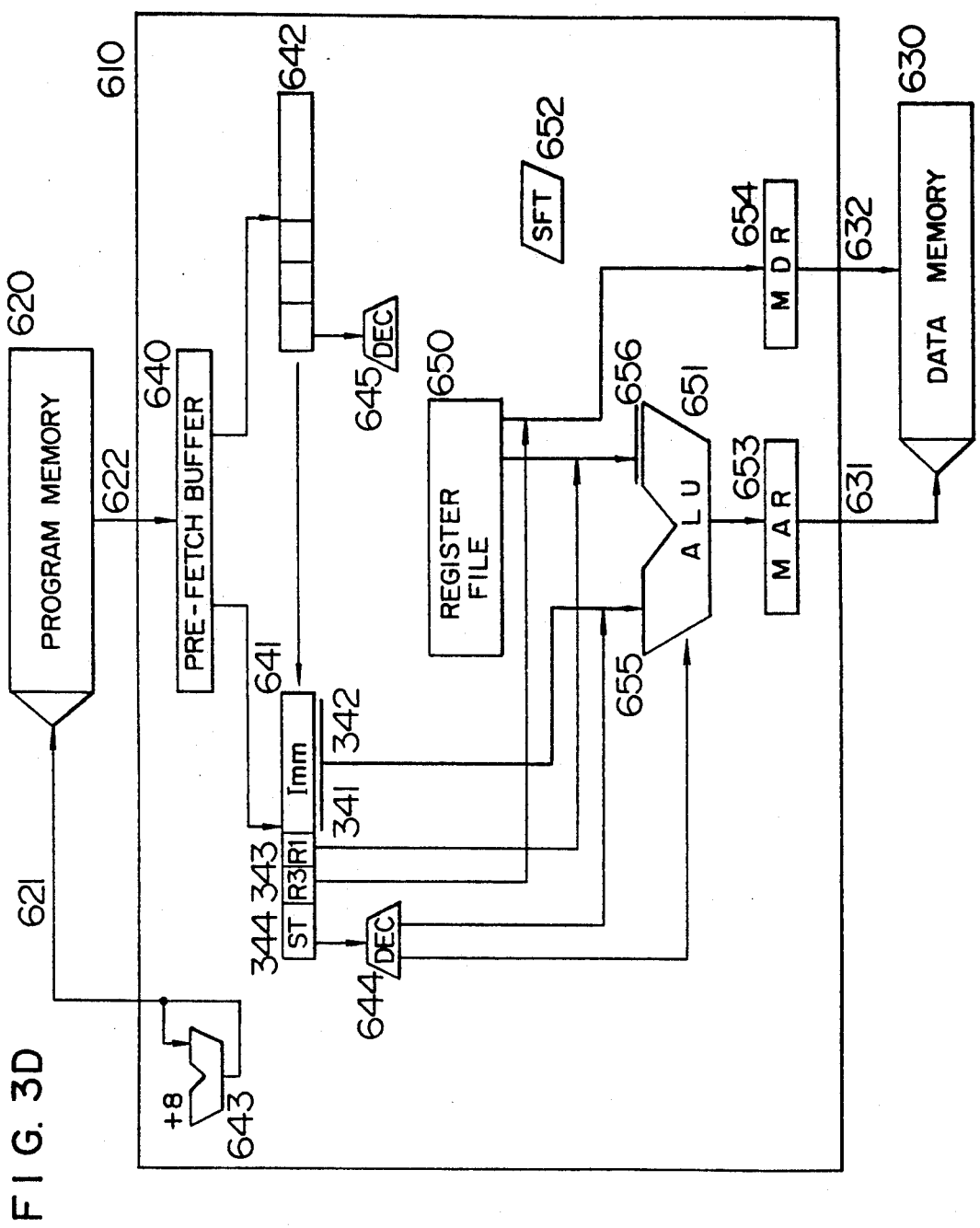
F I G. 3D

PROGRAM MEMORY

F I G. 5

| OP CODE | INSTRUCTION MNEMONIC | OP CODE | INSTRUCTION MNEMONIC |
|---|---|---|---|
| 000000 | L U I (510) | | |
| 000001 | A D D I (512) | 100001 | A D D (552) |
| 000010 | S U B I (514) | 100010 | S U B (554) |
| 000011 | A N D I (516) | 100011 | A N D (556) |
| 000100 | O R I (518) | 100100 | O R (558) |
| 000101 | E O R I (520) | 100101 | E O R (560) |
| 000110 | S L L I (522) | 100110 | S L L (562) |
| 000111 | S R L I (524) | 100111 | S R L (564) |
| 001000 | S R A I (526) | 101000 | S R A (566) |
| 001001 | L D (530) | | |
| 001010 | S T (532) | | |
| 001011 | J U M P (534) | | |
| 001100 | B c c (536) | | |

RISC SYSTEM CAPABLE OF SIMULTANEOUSLY EXECUTING DATA INTERLOCKED SHIFT AND ARITHMETIC/LOGIC INSTRUCTIONS IN ONE CLOCK CYCLE BY BYPASSING REGISTER

BACKGROUND OF THE INVENTION

1. Field of the Invention

The present invention relates to a data processor like a microprocessor (MPU), and in particular, to a method of processing simultaneous execution of two instructions in a 32-bit reduced instruction set computer (RISC) processor.

2. Description of the Related Art

Known examples related to the present invention have been described in pages A-39 and A-58 of the "MIPS RISC Architechture", Prentice-Hall Ltd. (1988), in pages 54 to 55 of the "Digest of Technical Papers" of the 1989 IEEE International Solid-State Circuit Conference, and in pages 199 to 209 of an article entitled "Microprocessor 80860 Including One Million Transistors Integrated Therein For Scientific Computations And Visualization", Nikkei-Electronics, Apr. 3, 1989 (No. 470).

Recently, the reduced instruction set computer (RISC) architecture has been employed in a processor system having a high performance. In such a RISC processor system, the instruction code length is fixed to 32 bits. Consequently, when 32-bit immediate data are to be operated, an operation thereon is required to be achieved with two instructions, for example, as follows.

```
LUI rt, <upper 16 bits>

ORl rt,rt, <lower 16 bits>
```

The first instruction here is a load upper immediate instruction, which shifts to the left-hand side by 16 bits 16-bit immediate data specified therein to attain 32-bit data, thereby storing the 32-bit data in a t-th register rt.

The second instruction is an or immediate instruction, which adds 16-bit 0s to the upper portion the 16-bit immediate data specified therein to compute an OR operation between the resultant data and the content of the t-th register rt, thereby storing a result of the OR operation in the register rt.

When these two instructions are executed, the register rt is loaded with the 32-bit immediate data.

Specifications of a processor of this kind have been described in the architecture manual of the 32-bit microprocessor R2000 published from the MIPS Computer Systems Inc.

SUMMARY OF THE INVENTION

As described above, in the conventional RISC processor, when 32-bit immediate data are processed in the conventional RISC processor, the processing is executed based on two instructions, namely, two cycles are required for an execution thereof.

Recently, on the other hand, there has been proposed a processor in which the bus data width is increased to 64 bits so as to improve the processing performance through an expansion of the bus width. In the 1989 IEEE International Solid-State Circuits Conference (ISSCC), a microprocessor having a 64-bit data bus has been proposed by the Intel Corp., for example.

However, also in the above microprocessor, the instruction format is fixed to 32 bits in consideration of the code efficiency and the like. In consequence, although a 64-bit instruction may possibly be fetched at a time, 32-bit immediate data is divided into two 16-bit data, which are processed based on two instructions executed by use of two cycles.

Furthermore, the microprocessor of the Intel Corp. is designed to employ a processing method in which two instructions are fetched in a cycle by using the 64-bit bus so that if the fetched instructions include a combination of an integer instruction and a floating-point instruction, these instructions are simultaneously executed for the following reason. Namely, the integer instruction and the floating-point instruction respectively require general-purpose registers for integers and floating-point registers for floating-point values. Consequently, these instructions are independent of each other with respect to the executions thereof. On the other hand, this processing method cannot be applied to a processing procedure in which two integer instructions are to be executed at the same time.

It is therefore an object of the present invention to provide a data processor in which two instructions can be simultaneously executed in consideration of dependence relationships therebetween.

According to the present invention disclosed in this application, a microprocessor associated with a typical embodiment of the present invention is briefly summarized as follows.

The microprocessor in a representative embodiment according to the present invention comprises:

(1) an instruction fetch unit (640) for fetching therein from a memory first and second instructions each having a predetermined instruction length in bits (32 bits) and for outputting therefrom the first and second instructions in a parallel manner;

(2) a first instruction decoder (644) for receiving as an input thereto an operation code of the first instruction supplied from said instruction fetch unit (640);

(3) a second instruction decoder (645) for receiving as an input thereto an operation code of the second instruction fed from said instruction fetch unit (640);

(4) an instruction execution unit at least including a register file (650), an arithmetic and logic unit (651) and a shifter (652), for being controlled in accordance with at least one of decode results from said first instruction decoder (644) and from said second instruction decoder (645);

(5) a first comparator (132) for comparing information of a destination field (112) of the first instruction outputted from said instruction fetch unit (640) with information of a first source field (132) of the second instruction outputted from said instruction fetch unit (640); and (6) a second comparator (131) for comparing information of a destination field (112) of the first instruction outputted from said instruction fetch unit (640) with information of a destination field (122) of the second instruction outputted from said instruction fetch unit (640), said register file (650) including a plurality of registers (R0, R1, R2, R3, ... , R31), said microprocessor further including a signal transmission path for supplying, depending on a control condition associated with an output from said first comparator (132) and an output from said second comparator (131), the output from the shifter (652) related to immediate data (114) of the first instruction to an input (656) of said arithmetic and logic unit (651) by bypassing said register file (650). In this regard, reference is to be made to FIG. 1A.

The instruction fetch unit (640) fetches in a cycle the first and second instructions from the memory (620) such that the fetched first and second instructions are decoded by the first and second decoders (644, 645), respectively.

The instruction execution unit (650, 651, 652) is controlled depending on decode results from the first and second decoders (644, 645).

The condition under which the register file (650) is bypassed when the output from the shifter (652) is fed via the signal transmission path to the input (656) of the arithmetic and logic unit (651), is as follows. Namely, the condition includes a condition that the first instruction outputted from the instruction fetch unit (640) is an (LUI) instruction which inherently or ordinarily sets the output from the shifter (652) related to the immediate data (114) of the first instruction, regardless of the arithmetic and logic unit (651), to a register (R3) selected from the register file (650) specified by the information of the destination field (112) of the first instruction; a condition that the second instruction fed from the instruction fetch unit (640) is an instruction which ordinarily processes, regardless of the shifter (652), information of a register (R3) selected from the register file (650) specified by the information of the first source field (123) of the second instruction and information related to the second source field (124) of the second instruction by use of the arithmetic and logic unit 651 to set a result of the processing to a register (R3) selected from the register file (650) specified by the information of the destination field (122) of the second instruction; and a condition that the inputs (112, 123) to the first comparator (132) are equal to each other.

Under the condition above, the first and second instructions can be basically executed at the same time. Furthermore, while bypassing the register file (650), the system supplies the output from the shifter (652) related to the immediate data (114) of the first instruction to the input (656) of the arithmetic and logic unit (651) at a high speed, the output being as information of the first source field (123) of the second instruction.

If the above method of bypassing the register file (650) is not adopted in a situation of a large number of registers (R0 to R31) constituting the register file (650), a considerably long delay period of time is to be consumed when the output from the shifter (652) is transmitted via the register file (650) to the input (656) of the arithmetic and logic unit (651). In this point of view, the representative embodiment according to the present invention is quite suitable for the reduction of the delay time.

Let us assume in the above situation that there is imposed a condition, in addition to the condition that the inputs (112 and 123) of the first comparator (132) are equal to each other, that the second comparator (131) receives an equal value for the inputs (112, 122), namely, that the destination fields (112, 122) of the first and second instructions and the first source field (123) of the second instruction are the same information. In this case, even if the first instruction (LUI instruction) ordinarily sets data of the shifter (652) to the register R3, the data of the register R3 is thereafter updated by use of data of a result obtained from the subsequent second instruction (ORI instruction) processed by the arithmetic and logic unit (651). The operation of the foregoing first (LUI) instruction to set the data of the shifter (652) to the register R3 becomes to be meaningless; moreover, an insignificant period of time is elapsed to update the data.

As contrast therewith, in accordance with the typical embodiment of the present invention, there is established a condition, in addition to the condition that the inputs (112 and 123) of the first comparator (132) are equal to each other, that the second comparator (131) receives an equal value for the inputs (112, 122), the shift result of the barrel shifter (652) executed by the first instruction (LUI) is not set to the register file (650) but is directly fed via the signal transmission path at a high speed to the one (656) of the inputs of the arithmetic and logic unit (651). On the other hand, the other one (655) of the inputs thereof is supplied with the extended 32-bit data of the immediate data (124) of the second instruction. With this provision, the first instruction (LUI) and the second instruction (ORI) can be executed in a cycle at a high speed.

The foregoing and other objects, advantages, manner of operation, and novel features of the present invention will be understood from the following detailed description when read in connection with the accompanying drawings.

BRIEF DESCRIPTION OF THE DRAWINGS

FIGS. 3A, 3B, 3C, and 3D are each block diagrams illustratively showing operations in which, the data processor executes two instructions in a serial manner;

FIG. 5 is a table showing a bit allocation for the instruction operation code in the data processor.

DESCRIPTION OF THE PREFERRED EMBODIMENTS

Figure 1A:
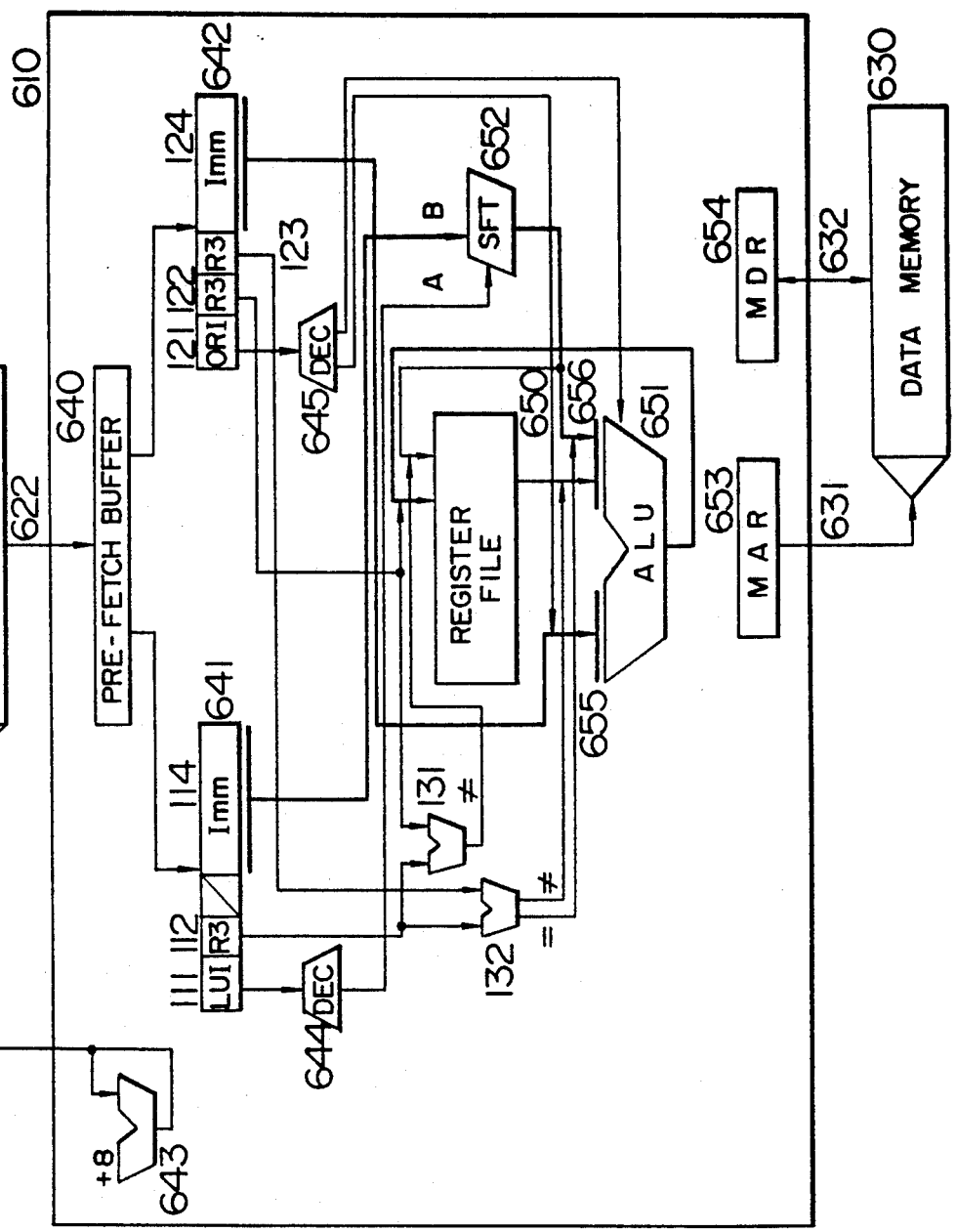
FIGS. 1A and 1B are each schematic block diagrams respectively showing embodiments of a data processor capable of simultaneously executing two instructions in accordance with the present invention.

Referring now to the drawings, a description will be given of an embodiment according to the present invention.

Outline of the Data Processor

Figure 6:
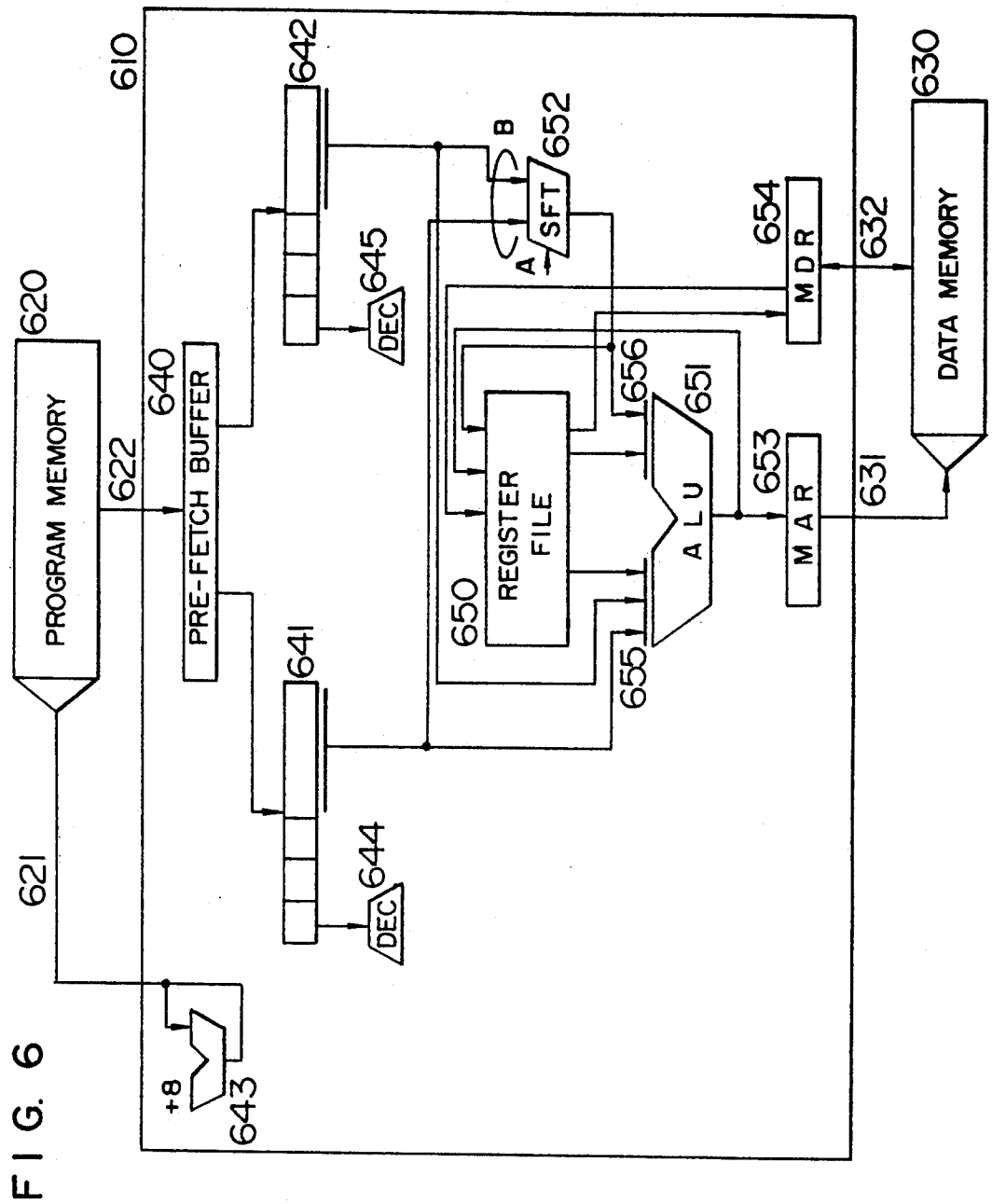
FIG. 6 is a block diagram showing the basic system configuration of the data processor of FIG. 1.

FIG. 6 is a block diagram showing a data processor as an embodiment in accordance with the present invention. The data processor basically includes a processor unit 610, a program memory 620, and a data memory 630.

The program memory 620 is connected to the processor 610 by means of an instruction address bus 621 and an instruction data bus 622. The instruction address bus 621 is 32 bit wide for addressing up to four gigabytes (G bytes). The instruction data bus 622 is 64 bit wide. With this provision, two instructions can be simultaneously fetched from the program memory 620 through a transfer operation.

The data memory 630 is connected to the processor 610 via an operand address bus 631 and an operand data bus 632. The operand address bus 631 is 32 bit wide for addressing up to four gigabytes (G bytes). The operand data bus 632 is 32 bit wide. With this provision, data of a word can be fetched from or stored in the data memory 630 through a transfer operation.

The program and data memories 620 and 630 respectively act as an instruction cache memory and a data cache memory, which respectively hold therein copies of portions of instructions and data of the main memory (not shown).

Internal Structure of Processor

The processor 610 includes a program counter 643 for computing an address of an instruction, a prefetch buffer 640 for holding therein an instruction prefetched, a first instruction register 641, a second instruction register 642, a first instruction decoder 644, a second instruction decoder 645, a register file 650, an arithmetic and logic unit 651, a barrel shifter 652, a memory address register (MAR) 653, and a memory data register (MDR) 654.

Prefetch Unit

The prefetch buffer 640 used as a prefetch unit is 64 bit wide and holds two instructions fetched from the program memory 620 at a time. The prefetch buffer 640 transfers contents thereof to the first and second registers 641 and 642 when these registers are ready for a data receive operation. Namely, the instructions on left-hand and right-hand sides in the buffer 640 are moved to the first and second registers 641 and 642, respectively.

In this embodiment, a big-endian addressing is adopted so that the left and right instructions held in the prefetch buffer 640 are executed in this order.

Register File

The register file 650 includes 32 registers R0 to R31 each being 32 bit wide. A 3-port read operation and a 3-port write operation can be simultaneously performed on the register file 650.

Instruction Execution Unit

The instruction execution unit includes an arithmetic and logic unit 651 and a barrel shifter 652. The arithmetic and logic unit 651 includes an arithmetic logic unit (ALU) having a 32-bit input 655 on side A and a 32-bit input 656 on side B to execute 2-input arithmetic and logic operations. The barrel shifter 652 functions to shift the input on side B by the number of bits specified by the input on side A.

Instruction Format

Figure 1B:
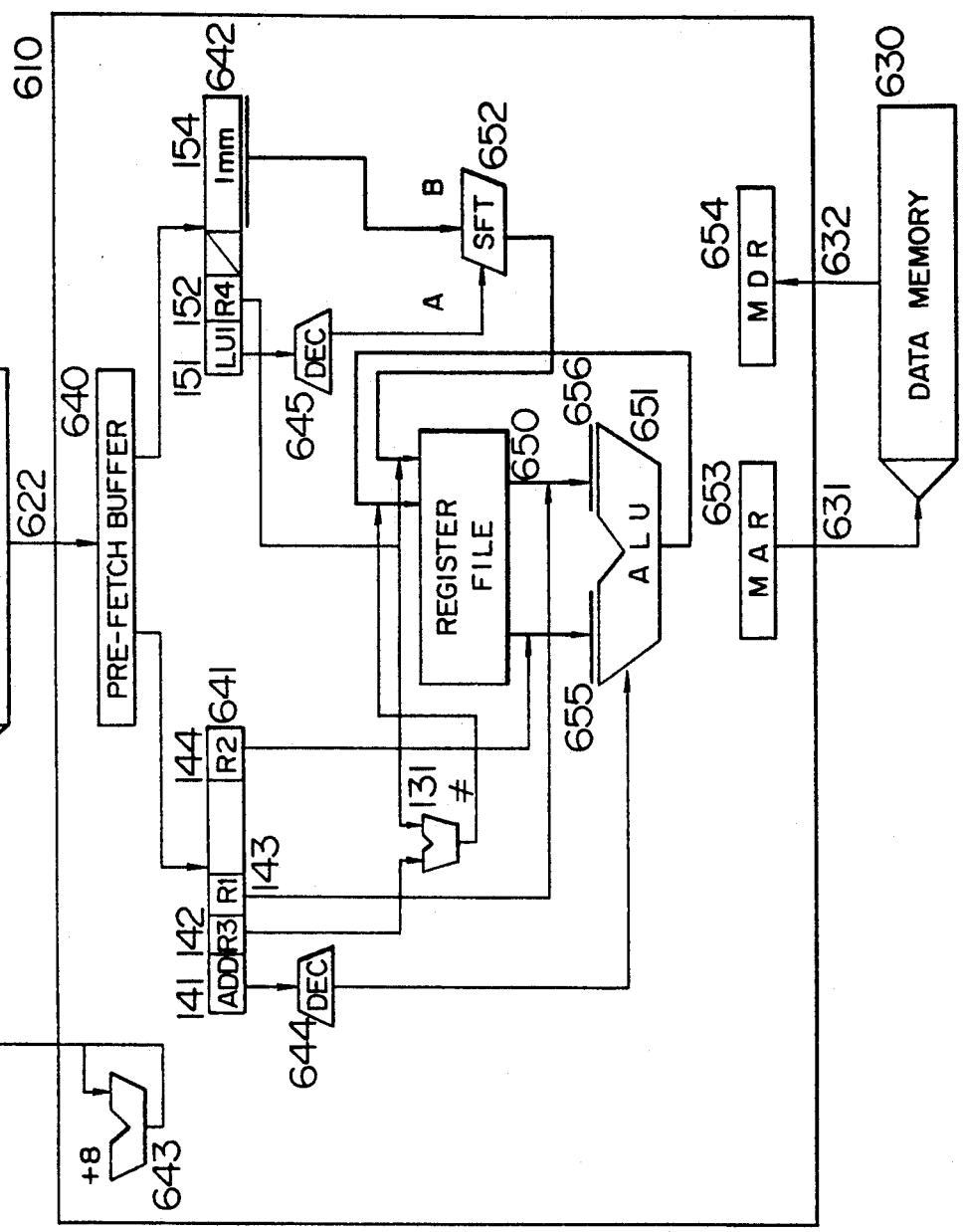
Figure 2A:
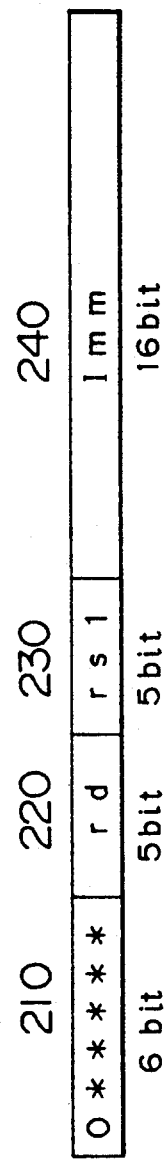
FIGS. 2A and 2B together are diagrams respectively showing instruction formats for the embodiments of the data processor according to the present invention.
Figure 2B:
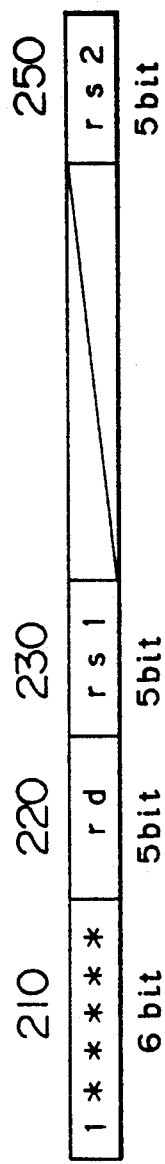

FIGS. 2A and 2B show instruction formats for the embodiments of the data processor of FIG. 1. As shown in these figures, an instruction is fixed to be 32 bit long and is composed of a 6-bit field 210, 5-bit field 220, a 5-bit field 230, and a 16-bit field 240. The left-most 6-bit field 210 contains an operation (OP) code denoting an instruction type. The subsequent 5-bit field 220 is a destination field specifying a register in which a result of an instruction execution is stored. The next 5-bit field 230 is a first source field designating one of the field 240 is a second source field indicating the other one of the inputs of the instruction.

This field 240 is employed to store 16-bit immediate data as shown in FIG. 2A or to specify a register by five low-order bits thereof as shown in FIG. 2B, depending on whether the left-most bit of the operation code 210 is set to 0 or 1, respectively. The instructions of the formats of FIGS. 2A and 2B are called immediate and register instructions respectively.

In this embodiment, the register file 650 includes 32 registers and hence five bits are required to specify these registers as above.

FIG. 5 shows a bit allocation of the operation code 210.

A load upper immediate (LUI) instruction 510 concatenates 16-bit 0s on the right-hand side than 16-bit immediate data of the second source field 240 to create 32-bit immediate data and to store the resultant data in a register denoted by the destination field 220.

An add immediate (ADDI) instruction 512 concatenates 16 bits each being identical to the uppermost bit of the content in the second source field 240 on the left-hand side of 16-bit immediate data of the second source field 240 to achieve a sign extension for creation of 32-bit immediate data. The resultant data is then added to the content of a register denoted by the first source field 230 so as to store the obtained data in a register designated by the destination field 220.

A subtract immediate (SUBI) instruction 514 achieves a sign extension of the second source field 240, like in the case of the ADDI instruction 512, to attain 32-bit immediate data. The data is then subtracted from the content of a register denoted by the first source field 230 so as to store the obtained data in a register designated by the destination field 220.

An and immediate (ANDI) instruction 516 concatenates 16-bit 0s to 16-bit immediate data of the second source field 240 on the right-hand side to create 32-bit immediate data in a zero-extension manner to perform an AND operation between the data and the content of a register indicated by the first source field 230 in a bit-by-bit fashion. Thereafter, the resultant data is stored in a register denoted by the content of the destination field 220.

An or immediate (ORI) instruction 518 and an exclusive or immediate (EORI) instruction 520 respectively perform an OR operation and an exclusive OR operation in the similar manner as for the ANDI instruction 516.

A shift left logical immediate (SLLI) instruction 522 shifts the content of a register denoted by the content in the first source field 230 left by a value specified by 16-bit immediate data of the second source field 240 to store the resultant data in a register designated by the content of the destination field 220. In this operation, a value of 0 is sequential added at the right-most bit position.

A shift right logical immediate (SRLI) instruction 524 conducts, in a similar fashion as for the SLLI instruction 522, a shift operation of data toward the right In this operation, a value of 0 is sequentially added at the left-most bit position.

A shift right arithmetic immediate (SRAI) instruction 526 conducts, like the SLLI instruction 522, a shift operation of data toward the right. However, in this operation, a value equal to the right-most bit of a register indicated by the content of the first source field is sequentially added at the left-most bit position.

A load (LD) instruction 530 conducts, like the ADDI instruction 512, a sign extension on the second source field 240 to obtain 32-bit immediate data to add the resultant data to the content of a register denoted by the content of the first source field 230. Using the result of the addition as an address, the content of data memory at the address is stored in a register indicated by the content of the destination field 220.

A store (ST) instruction 532 attains, like the LD instruction 530, an address for storing the content of a register designated by the content of the destination field 220 in a location of the data memory at the address.

A jump (JUMP) Instruction 534 is an unconditional branch instruction, which determines like the LD instruction 530, an address for passing control of a program to the address.

Branch (Bcc) instruction 536 is a conditional branch instruction. When a branch condition is satisfied, 16 bits each equal to the value of the upper-most bit of the content in the second source field 240 are concatenated to 16-bit immediate data of the second source field 240 on the left to obtain 32-bit immediate data in a sign extension manner. The data is added to a value of the program counter (PC) indicating an address of the current instruction. Control of the program is then passed to an address denoted by the result of the addition. Incidentally, the branch condition is specified by five bits of the destination field 220.

Instructions ranging from an ADD Instruction 522 to an SRA instruction 566 are respectively associated with the ADDI instruction 512 to the SRAI instruction 526. However, when executing each of the instructions from the ADD instruction 522 to the SRA instruction 566, a content of a register is employed for the second source operand.

Architechture of Simultaneously Executing two Instructions

FIGS. 1A and 1B are diagrams showing, in association with FIG. 6, characteristic structures and operations for the simultaneous execution of two instructions in accordance with the present invention.

FIG. 1A shows a configuration for simultaneously executing an LUI instruction and another instruction as a feature of the embodiment according to the present invention. In execution of the LUI instruction, the arithmetic and logic unit 651 is not used so that a result of the shift operation performed by the barrel shifter 652 is ordinarily stored in a register of the register file 650. In execution of the another instruction, the barrel shifter 652 is not used, namely, the arithmetic and logic unit 651 and the register of the register file 650 associated with the LUI instruction are used.

Assume that the LUI instruction is fetched in the left side of the buffer 640 through the 64-bit instruction data bus 622, whereas the ORI instruction is fetched in the right side of the buffer 640.

In the case, conventionally, in execution of the LUI instruction, the immediate data 114 is shifted left by the barrel shifter 652 to set the shifted data to the register R3 of the register file 650. By the next ORI instruction, the left-shifted immediate data 114 by the previous LUI instruction is ORed with immediate data extented to 32 bits 124 to store the ORed result in the register R3.

However, even if the preceding LUI instruction ordinarily set the left-shifted data in the register R3, the data set in the register R3 is thereafter updated by the ored data by the succeeding ORI instruction. Namely, the operation of the previous LUI instruction becomes to be meaningless.

In contrast therewith, according to the embodiment of FIG. 1A, the result of the shift operation of the barrel shifter 652 associated with the LUI instruction is not stored in the register file 650 but is fed to the input 656 of the arithmetic and logic unit 651 for an execution of the ORI instruction. The other input 655 thereof is supplied with the extented 32-bit immediate data 124. Thus, in accordance with the embodiment of FIG. 1A, these two instructions, namely, the LUI and ORI instructions can be executed in a cycle.

Note that the 32-bit immediate data in the register R3 is used as a 32-bit constant in execution of arithmetic instructions (ADD, SUB, etc.) and logical instructions (AND, OR, EOR, etc.) Alternatively, the data may also be employed as a 32-bit address in execution of memory instructions (LD and ST) and a branch instruction (JUMP).

A description will next be given in detail of the simultaneous execution of these two instructions.

The LUI instruction fetched in the left side of the buffer 640 through the 64-bit instruction data bus 622 is set to the first instruction register 641. At the same time, the ORI instruction fetched through the right side thereof is set in the second instruction register 642.

The first instruction decoder 644 decodes the operation code in the field 111 of the first instruction register 641. When detecting that the instruction is an LUI instruction, the first instruction decoder 644 activates the second instruction decoder 645 so that the instruction set therein is decoded, thereby initiating a parallel execution of the LUI and ORI instructions.

Namely, in the LUI instruction operation, 16-bit 0s are concatenated on the right side then the 16-bit immediate data in the second source field 114 of the first instruction register 641 to obtain extended 32-bit data by the shifter 652. The shifter 652 is controlled by the first decoder 644 which decodes the operation code 111 in the first instruction register 641.

Moreover, the comparator 131 compares the content in the destination field 112 of the first instruction register 641 with the content in the destination field 122 of the second instruction register 642. If both the contents in the fields 112 and 122 are not equal to each other, the shift result is loaded from the shifter 652 into the register R3 specified by the content in the destination field 112 of the first instruction register 641. Since both the contents in these fields are identical to each other, the result is not loaded in the register R3.

Simultaneously, in the ORI instruction operation, the 16-bit immediate data in the second source field 124 is extended into 32-bit data. Moreover, the comparator 131 compares the content in the destination field 112 of the first instruction register 641 with the content in the first source field 123 of the second instruction register 642. If both the contents in the fields 112 and 123 are equal to each other (namely, the content in the destination register of the LUI instruction is identical to that in the source register of the ORI instruction), the read operation from the R3 register specified by the content in the first source field is suppressed. In place of the read operation, the shift result from the shifter 652 is ORed with the extented 32-bit immediate data 124 by means of the arithmetic and logic unit 651 to store the ORed result in the register R3 specified by the content in the destination field 122. The arithmetic and logic unit 651 operates under control of the second decoder 645 which decodes the operation code 121 of the content in the second instruction register. Furthermore, the extension of the immediate data in the second source field 124 is also controlled by the second decoder 645.

The next instruction to be executed has been held in the prefetch buffer 640. This instruction is therefore transferred to the first and second instruction registers 641 and 642 to perform the executions of these instructions in the similar manner as above.

FIG. 1B shows another operation for simultaneously executing an LUI instruction and another instruction as a feature to the present invention. In execution of the LUI instruction, the arithmetic and logic unit 651 is not used so that the shift result from the barrel shifter 652 is ordinarily set to a register of the register file 650. In execution of the another instruction, not the barrel shifter but the arithmetic and logic unit 651 is used and the set operation is performed on a register in the register file 650 other than the register used in the LUI instruction.

Assume that the ADD instruction is fetched in the left-side portion of the buffer 640 through the 64-bit instruction data bus 622, whereas the LUI instruction is fetched in the right-side portion thereof. According to the ADD instruction, the contents of the registers R1 and R2 are added to each other to store the result in the register R3 and the LUI instruction sets immediate data in a upper portion of the register R4. Since this operation does not cause any confliction between the registers in the register file 650, the ADD and LUI instructions can be executed in a cycle.

Next, the operation of FIG. 1B will be described in detail.

First, the ADD instruction fetched in the left side of the buffer 640 through the 64-bit instruction data bus 622 is stored in the first instruction register 641, whereas the LUI instruction fetched in the right side thereof is set in the second instruction register 642. The second instruction decoder 645 decodes the operation code in the field 151 of the second instruction register 642 to detect that the instruction is the LUI instruction to activate the result of the second instruction decoder 645, thereby initiating the simultaneous executions of the ADD and LUI instructions in an identical cycle.

In the ADD instruction operation, the content in the register R1 is read in accordance with the content in the first source field 143 of the first instruction register 641. Moreover, the content of the register R2 is read therefrom in accordance with the content in the second source field 144 of the register 641. The arithmetic and logic unit 651 calculates a sum between these contents to store the result in the register R3 specified by the content in the destination field 142. The unit 651 operates under control of the first decoder 644 which decodes the operation code 141 of the first instruction register 641. Furthermore, the comparator 131 compares the content in the destination field 142 of the first instruction register 641 with the content in the destination field 152 of the second instruction register 642. If these fields are equal to each other, namely, the content in the destination field of the ADD instruction is identical to that of the LUI instruction, the operation for storing the result of the ADD instruction in the register R3 is suppressed. In place of this operation, the execution result of the LUI instruction is stored in the register R3.

At the same time, in the LUI instruction operation, 16-bit 0s are concatenated on the right side then the 16-bit immediate data in the second source field 154 of the second instruction register 642 by the shifter 652 to obtain extented 32-bit data and the resultant data is stored in the register R4 denoted by the content in the destination field 152. The shifter 652 operates under control of the second decoder 654 which decodes the operation code 151 of the second instruction register 642.

The subsequent instruction to be executed has been held in the prefetch buffer 640. The instruction is transferred to the first and second instruction registers 641 and 642 to be executed in the same fashion as described above.

Delay Branch and Delay Slot

In a branch instruction, a delayed branch technique has been adopted in many cases. In this technique, a cycle following a branch instruction is called a delay slot, which is used to execute an instruction immediately succeeding the branch instruction in a program compiled for the RISC processor. Succeeding the execution of the instruction immediately succeeding the branch instruction, the branch instruction is actually executed.

The instruction immediately after the branch instruction in a program compiled for the RISC processor corresponds to an instruction immediately preceding a branch instruction of a program compiled for an ordinary data processor such as a complex instruction set computer (CISC).

On the other hand, as described above, in the RISC processor system, an instruction immediately following a branch instruction (corresponding to an instruction immediately preceding a branch instruction in the case of the CISC processor) is first executed and then the branch instruction is performed.

For details about the delayed branch and the delay slot, reference is to be made to pages 1-9 and 1-10 of the "mips RISC ARCHITECTURE" written by Gerry Kane (1988).

In short, in an ordinary processor, an instruction fetch step, an instruction decode step, and an instruction execution step are performed in a multi-stage pipeline manner for a parallel processing of instructions. In the pipeline concurrent processing, while a branch address is being computed for a branch instruction, the instruction fetch unit continuously fetches instructions following the branch instruction.

In the conventional CISC processor, when performing a branch, an instruction which follows the branch instruction and which is fetched in advance is invalidated so that the branch destination instruction is fetched and then the decode step and the execution step are executed for the branch destination instruction. Consequently, in the CISC processor, after two cycles are elapsed for the execution of the branch instruction, a cycle in which any operation is not executed, namely, a no-operation cycle appears.

In the RISC processor, on the other hand, when executing a branch instruction, without invalidating an instruction which immediately follows the branch instruction and which is fetched in advance (corresponding to an instruction immediately preceding the branch instruction in the case of the CISC processor), the instruction is first executed and then the branch instruction is performed, thereby achieving a fetch step of the branch destination instruction.

As above, in the RISC processor, a branch instruction is followed in a program by a significant instruction not to be invalidated; consequently, the cycle can be effectively used. This branch operation is called a delayed branch and the cycle after the branch instruction is called a delay slot.

Delay Slot and LUI Instruction Processing

A description will now be given of a method of executing the LUI instruction in association with a delay slot of the delayed branch in the RISC processor in the embodiment according to the present invention.

In a case where the first and second instructions respectively are a branch instruction and an LUI instruction, there may be employed a first method in which the LUI and branch instructions are simultaneously executed so that the delay slot of the delayed branch is allocated to execution of a third instruction. As a second method, if the third instruction is also an LUI instruction, a fourth instruction may be also executed in the delay slot in addition to the operation of the first method. Conversely, if the third instruction is an ordinary instruction and the fourth instruction is an LUI instruction, the third and fourth instructions may be simultaneously executed in the delay slot. In a third method, when the LUI instruction is in the delay slot of the delayed branch, it may also be possible that the processing methods above are suppressed so that, without conducting the simultaneous execution of the LUI and branch instructions, the LUI instruction is executed in the delay slot.

Furthermore, in a case where the first instruction is an LUI instruction, which immediately follows a branch instruction, a fourth method may be adopted to simultaneously execute the first LUI instruction and a second ordinary instruction immediately after the branch instruction in the delay slot. In a fifth method, like in the case of the third method, while suppressing the simultaneous execution of the LUI instruction and the instruction following the LUI instruction, the LUI instruction in the delay slot is independently executed.

As mentioned above, since various processing methods may be adopted for the LUI instruction in association with the delay slot, the LUI instruction executing method is required to be defined in advance in relation to the software (particularly, in association with the compiler).

In the description of FIG. 1A above, the instruction immediately preceding the LUI instruction is not a branch instruction. If the instruction is a branch instruction, in the embodiment of FIG. 1A, the LUI instruction is executed in the delay slot of the branch instruction; moreover, the ORI and LUI instructions are not simultaneously executed.

In the explanation of FIG. 1B, the instruction immediately preceding the LUI instruction is not a branch instruction but an ADD instruction. If the instruction immediately preceding the LUI instruction (i.e. the instruction on the left side in FIG. 1B) is a branch instruction, the LUI instruction is executed in the delay slot of the branch instruction in the embodiment of FIG. 1B. Namely, the LUI instruction and the instruction on the left side, i.e., the branch instruction are not simultaneously executed.

Serial Execution of Two Instructions

Referring now to FIGS. 3A to 3D, a description will be given of a case where the data processor of FIGS. 1A and 1B and FIG. 6 cannot simultaneously execute two instructions, namely, two instructions are executed in a serial manner.

FIG. 3A shows an operation in which the contents of the registers R1 and R2 are added to each other in accordance with an ADD instruction to store the resultant data in the register R3. It is assumed that the ADD instruction is fetched in the left-side portion of the buffer 640 through the 64-bit instruction data bus 622.

The contents of the registers R1 and R2 are read therefrom in accordance with the contents in the first and second source fields 311 and 312 of the first instruction register 641 to be added in the arithmetic and logic unit 651, thereby storing the result in the register R3 specified by the content of the destination field 313.

In this regard, the unit 651 operates under control of the first decoder 644 which decodes the operation code 314 of the first instruction register 641.

The next instruction to be performed has been held in the second instruction register 642. The instruction is then transferred to the first instruction register 641 to execute the processing as described above.

Figure 3B:
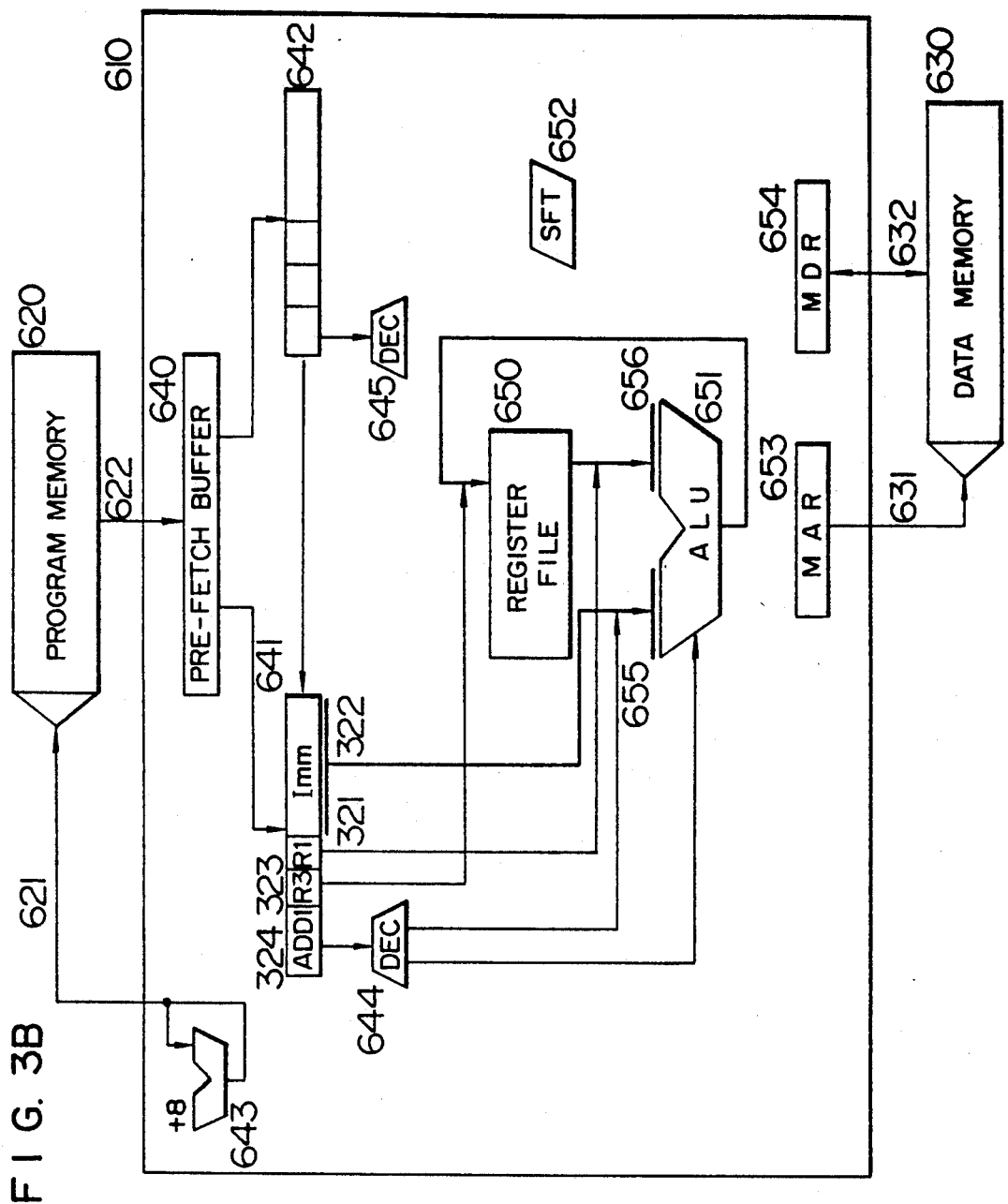

FIG. 3B shows the operation of an ADDI instruction in which th contents of the register R1 is added to the immediate data to store the result of the addition in the register R3. It is assumed here that the instruction has been fetched in the left-side portion of the buffer 640 through the 64-bit instruction data bus 622. The content of the register R1 is read therefrom in accordance with the content in the first source field 321 of the first instruction register 641, and the 16-bit immediate data of the second source field 322 is extented into 32-bit data. These data are added to each other in the unit 651, which stores the result in the register R3 specified by the content of the destination field 323. The unit 651 operates under control of the first decoder 644 which decodes the operation code 324 of the first instruction register 641. Furthermore, the sign extension of the immediate data of the second source field 322 is also controlled by the first decoder 644. The next instruction to be executed is in advance held in the second instruction register 642. The system transfers the instruction to the first instruction register 641 to execute the instruction as described above.

Figure 3C:
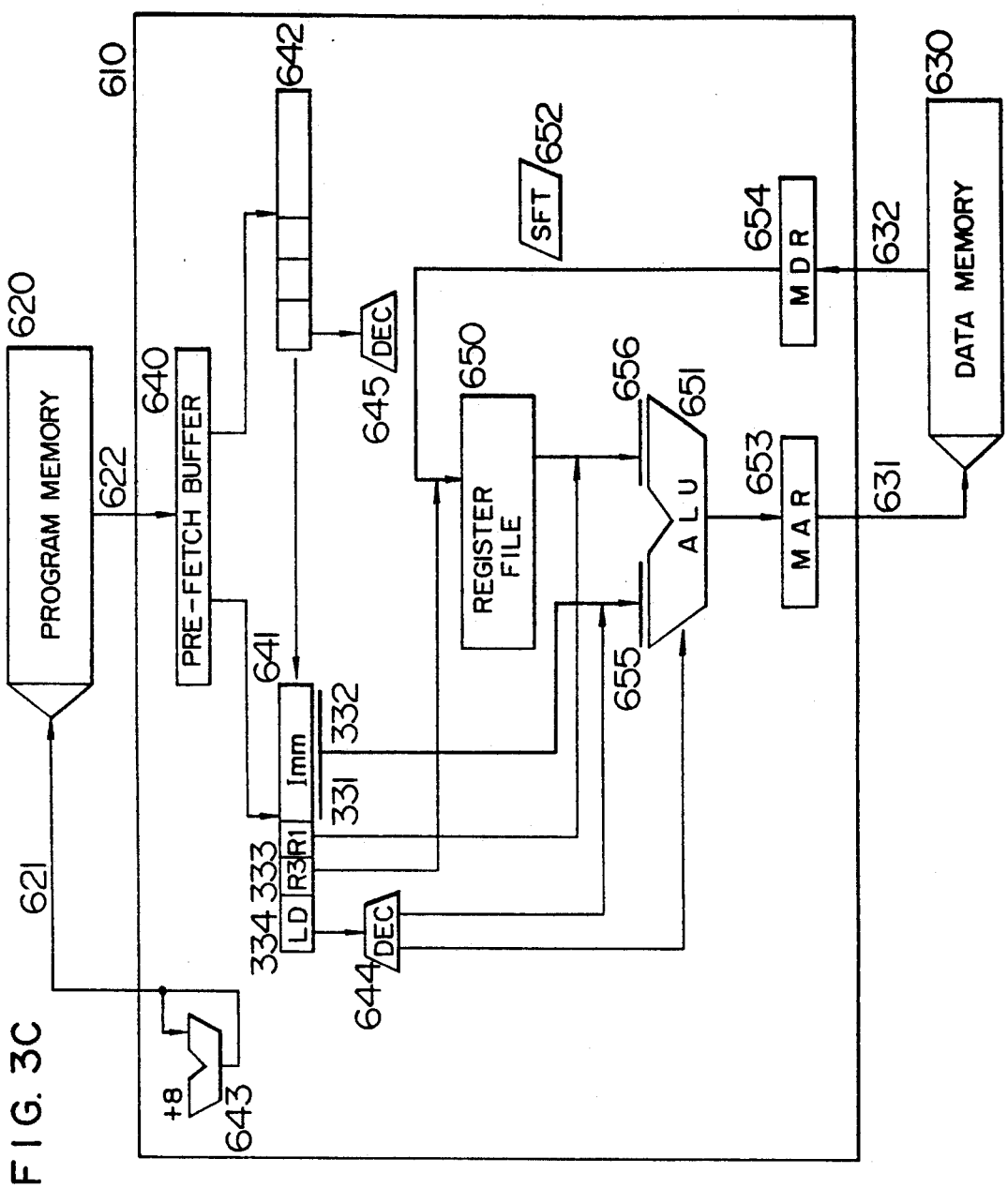

FIG. 3C shows the operation of the LD instruction in which the content of the register R1 is added to the immediate data to load the register R3 with data of the data memory 630 at an address designed by the result of the addition. It is assumed that the instruction has been fetched in the left-side portion of the buffer 640 through the 64-bit instruction data bus 622. The content of the register R1 is read therefrom in accordance with the content in the first source field 331 of the first instruction register 641, and the 16-bit immediate data of the second source field 332 is extented into 32-bit data. These data are added to each other in the unit 651, which transfers the result to the MAR 653 to access the data memory 630.

The data read out from the data memory 630 is transferred via the MDR 654 to be stored in the register R3 designated by the content of the destination field 313. The next instruction to be executed has been held in the second instruction register 642. The system transfers the instruction to the first instruction register 641 to execute the processing in the similar fashion as above.

FIG. 3D shows the operation of the ST instruction in which the content of the register R1 is added to the immediate data, thereby storing the content in the register R3 in the data memory 630 at an address designated by the result of the addition. It is assumed here that the instruction has been fetched in the left-side portion of the buffer 640 through the 64-bit instruction data bus 622. The content of the register R1 is read therefrom in accordance with the content in the first source field 341 of the first instruction register 641, and the 16-bit immediate data of the second source field 342 is extended into 32-bit data. These data are added to each other by the unit 651, which transfers the result to the MAR 653 to access the data memory 630. On the other hand, the write data is read from the register R3 designated by the content of the destination field 343 to be transferred via the MDR 654 to the data memory 630, which stores the data therein. The next instruction to be executed has been held in the second instruction register 642. The system transfers the instruction to the first instruction register 641 to execute the processing in the similar fashion as above.

Pipeline Processing

A description will now be given in detail of the pipeline processing performed by the data processor in association with the embodiments of FIGS. 1A, 1B, and 6.

Figure 4A:
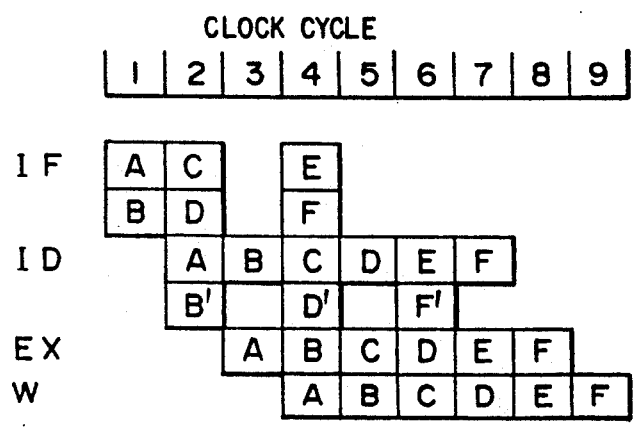
FIGS. 4A, 4B, and 4C together are diagrams showing operations of pipeline processing executed by the data processor.

FIG. 4A shows the pipeline processing in which two instructions are serially conducted in the embodiment of the processor. Instructions A to F are assumed to be stored in the program memory 620 in advanced, as shown in FIG. 4C.

In FIG. 4A, a box or frame corresponds to an operation in a clock cycle of each pipeline stage. This system includes four pipeline stages such as an instruction fetch (IF) stage, an instruction decode (ID) stage, an execution (EX) stage, and a result write (W) stage. Operations of the respective clock cycle will next be described.

1st Clock Cycle 64-bit data of two instructions (A and B) are fetched from the program memory 620 to be set to the prefetch buffer 640.

2nd Clock Cycle

The instructions (A and B) are set to the first and second instruction registers 641 and 642, respectively. The first and second decoders 644 and 645 respectively decode the instructions. In this case, if a register read operation and the immediate data extension are necessary, the operations are accomplished in this cycle.

Furthermore, 64-bit data of the next two instructions (C and D) are fetched from the program memory 620 to be set to the prefetch buffer 640.

3rd Clock Cycle

The decoded instruction A is executed; thereafter, the instruction B in the second instruction register 642 is set to the first instruction register 641 to be decoded by the first instruction decoder 644. In this operation, if a register read operation and the immediate data extension are necessary, the operations are accomplished in this cycle.

4th Clock Cycle

The execution result of the instruction A is stored in a register and then the decoded instruction B is executed. At the same time, two instructions (C and D) held in the prefetch buffer 640 are set to the first and second instruction registers 641 and 642 to be decoded by the first and second instruction decoders 644 and 645, respectively. In this case, if a register read operation and the immediate data extension are necessitated, the operations are accomplished in this cycle. Moreover, 64-bit data of the next two instructions (E and F) are fetched from the program memory 620 to be set to the prefetch buffer 640.

The system continuously performs the subsequent operations in the similar manner.

Figure 4B:
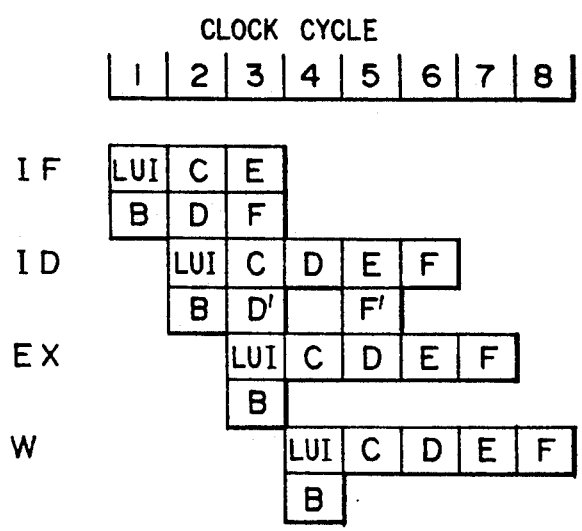
Figure 4C:
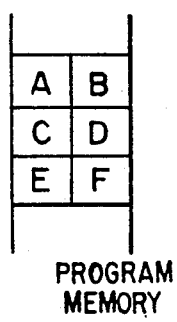

FIG. 4B shows the pipeline processing in which two instructions are simultaneously executed in the embodiment of the processor based on the features of the present invention. It is assumed that instructions A to F are stored in the program memory 620 in advance, as shown in FIG. 4C. Assuming the instruction A to be an LUI instruction, a description will be given of the respective clock cycles.

1st Clock Cycle 64-bit data of two instructions (A and B) are fetched from the program memory 620 to be set to the prefetch buffer 640.

2nd Clock Cycle

The instructions (A and B) are set in the first and second instruction registers 641 and 642 to be decoded by the first and second instruction decoders 644 and 645, respectively. The instruction A is resultantly detected to be an LUI instruction and hence the system makes preparations for a simultaneous execution of these two instructions. If a register read operation and an immediate data extension are here required, these operations are carried out in this cycle. Moreover, 64-bit data of the next two instructions (C and D) are fetched from the program memory 620 to be set to the prefetch buffer 640.

3rd Clock Cycle

The instruction A (LUI) and the instruction B are respectively decoded by the first and second instruction decoders 644 and 645, and are simultaneously executed. The instructions (C and D) loaded in the prefetch buffer 640 are respectively set to the first and second instruction registers 641 and 642 to be decoded by the first and second instruction decoders 644 and 645. In this operation, if a register read operation and an immediate data extension are necessary, the operations are accomplished in this cycle.

Furthermore, 64-bit data of the next two instructions (E and F) are fetched from the program memory 620 to be loaded in the prefetch buffer 640.

4th Clock Cycle

Execution results of the instructions A (LUI) and B are stored in a register and then the instruction C is decoded by the first instruction decoder 644 and is executed. The instruction D is set from the second instruction register 642 to the first instruction register 641 to be decoded by the first instruction decoder 644. In this case, if a register read operation and an immediate data extension are necessitated, the operations are accomplished in this cycle.

Thereafter, the system continues the processing in the similar manner as above.

In the description of FIG. 4B, the instruction A is an LUI instruction; however, as explained in conjunction with FIG. 1B, even when the instruction A is other than the LUI instruction and the instruction B is an LUI instruction, it is to be understood that these two instructions can be naturally executed at the same time.

In the embodiments described above, since the format of each instruction is limitedly defined, the instruction decode operation can be easily accomplished. In consequence, even when there are disposed two instruction decoders, the size of the circuit is not increased to an undesirable extent.

Moreover, in the embodiments the operation code of an instruction manipulating the immediate data is different from that of an instruction handling registers only in the left-most bit thereof. Consequently, the instruction decode operation, for example, to generate a control signal for the arithmetic and logic unit 651 and the like can be common to the above instructions, which advantageously simplifies the configuration of the instruction decoders.

In addition, whether or not the immediate data is to be processed can be determined depending on only the left-most bit of the operation code. This consequently simplifies the constitution of the instruction decoders for generating signals such as a control signal for the immediate generator circuit.

In consequence, according to the embodiments, two instructions fetched in one cycle through a bus having a wide data width can be simultaneously executed, and hence the load for each pipeline stage can be uniformly, which increases the usage efficiency of the hardware circuits.

Particularly, in accordance with the embodiments, without changing the conventional instruction format, 32-bit immediate data can be operated in one cycle, which leads to an improvement of the system performance with the system compatibility kept retained.

Moreover, according to the embodiments, when an LUI instruction is in a delay slot of a branch instruction, the simultaneous execution of the LUI instruction and another instruction is suppressed. Consequently, even when the conventional program is executed without any change, there do not appear any disadvantages and the processor system compatibility is guaranteed.

As described above, in accordance with the present invention, there can be easily implemented an instruction control system in which two instructions are simultaneously executed in consideration of dependence relationship on instructions before and after one of the two instructions.

Consequently, there can be achieved a data processor which has processing performance twice as high as that of the conventional processor upon a peak time.

While particular embodiments of the invention have been shown and described, it will be obvious to those skilled in the art that various changes and modifications may be made without departing from the present invention in its broader aspects.

We claim:

1. A data processor, employing a reduced instruction set computer architecture, the instruction code length of which is fixed to a predetermined bit length, comprising:
   an instruction fetch unit for fetching from a memory a first and a second instruction each having said predetermined bit length, and for outputting the first and second instructions in parallel;
   a first instruction decoder for decoding the first instruction received from said instruction fetch unit;
   a second instruction decoder for decoding the second instruction received from said instruction fetch unit;
   an instruction execution unit, including at least an arithmetic and logic unit, a shifter and a register file of a plurality of registers, being controlled by either one of a decoded results from said first instruction decoder and a decoded result from said second instruction decoder;
   a first comparator for comparing first inputs comprising a destination field of the first instruction outputted from said instruction fetch unit and a first source field of the second instruction outputted from said instruction fetch unit;
   a second comparator for comparing second inputs comprising the destination field of the first instruction outputted from said instruction fetch unit and a destination field of the second instruction outputted from said instruction fetch unit;
   a signal transmission path for supplying an output of said shifter directly to an input of said arithmetic and logic unit when said first instruction outputted from said instruction fetch unit is a first immediate instruction which instructs said shifter to operate on a first immediate data, when said second instruction outputted from said instruction fetch unit is a second immediate instruction which instructs said arithmetic and logic unit to operate on a second immediate data, and when both of said first and second comparators indicate the first and second inputs are equal,
   wherein a result of said shift operation of said shifter operating on said first immediate data of said first immediate instruction is supplied to said input of said arithmetic logic unit through said signal transmission path, and said result of said operation of said arithmetic logic unit operating on said second immediate data of said second immediate instruction is stored in a designated register in said register file thereby executing said first and second immediate instructions simultaneously within one clock cycle using said arithmetic and logic unit, said shifter and said register file.

2. A data processor according to claim 1,
   wherein said first immediate instruction is a load upper immediate instruction which shifts said first immediate data left by a predetermined bit number using said shifter, and
   wherein said second immediate instruction is an immediate instruction which operates on information read from one register in said register field designated by said first source field of the second immediate instruction and a data related to said second immediate data using said arithmetic and logic unit and stores a result of said logical operation into one register in said register file.

3. A data processor according to claim 2,
   wherein said second immediate instruction is an OR immediate instruction which computes an OR operation between said information read from said one register and said data related to said second immediate data.

4. A data processor, employing a reduced instruction set computer architecture the instruction code length of which is fixed to a predetermined bit length, comprising:
   an instruction fetch unit for fetching therein from a memory first and second instructions each having said predetermined bit length and for outputting therefrom the first and second instructions in parallel;
   a first instruction decoder for receiving as an input thereto an operation code of the first instruction supplied from said instruction fetch unit;

a second instruction decoder for receiving as an input thereto an operation code of the second instruction supplied from said instruction fetch unit;

an instruction execution unit, including at least an arithmetic and logic unit; a shifter and a register file of a plurality of registers, being controlled by either one of a decoded result from said first instruction decoder and a decoded result from said second instruction decoder;

a first comparator for comparing information of a destination field of the first instruction outputted from said instruction fetch unit with information of a first source field of the second instruction outputted from said instruction fetch unit;

a second comparator for comparing said information of said destination field of the first instruction outputted from said instruction fetch unit with information of a destination field of the second instruction outputted from said instruction fetch unit;

a signal transmission path for supplying an output of said shifter to an input of said arithmetic and logic unit so as to bypass said register field and for non-supplying said output of said shifter to said register file under condition that said first instruction outputted from said instruction fetch unit is a first immediate instruction which uses not said arithmetic and logic unit but said shifter in connection with an immediate data thereof and ordinarily stores a result of a shift operation of said shifter in connection with said immediate data of said first immediate instruction into one register of said register file designation by said destination field of said first immediate instruction, said second instruction outputted from said instruction fetch unit is a second immediate instruction which uses not said shifter but said arithmetic and logic unit in connection with an immediate data thereof and ordinarily stores a result of an operation of said arithmetic and logic unit in connection with said immediate data of said second immediate instruction into one register of said register file designated by said destination field of said second immediate instruction, said first immediate instruction and said second immediate instruction are outputted in parallel from said instruction fetch unit, and each of said first and second comparators detects that comparing inputs thereof are equal to each other, wherein under said condition said result of said shift operation of said shifter in connection with said immediate data of said first immediate instruction is supplied not to said designated register in said register file but to said input of said arithmetic and logic unit through said signal transmission path, and said result of said operation of said arithmetic and logic unit in connection with said immediate data of said second immediate instruction is stored in said designated register in said register field so as to execute said first and second immediate instruction simultaneously within one clock cycle by using said arithmetic and logic unit, said shifter and said register field.

5. A data processor according to claim 4, wherein said first immediate instruction is a load upper immediate instruction which shifts said immediate data thereof to the left-hand side by a predetermined bit number by using said shifter and ordinarily stores the shift result from said shifter into one register of said register field designated by said destination field thereof, and wherein said second immediate instruction is an immediate instruction which ordinarily reads out information from one register in said register file designated by said first source field thereof, ordinarily carries out a logical operation of the information read out from said one register in said register file designated by said first source field thereof and a data related to said immediate data thereof by using said arithmetic and logic unit and stores a result of said logical operation into one register in said register file designated by said destination field thereof.

6. A data processor according to claim 5, wherein said second immediate instruction is an or immediate instruction which computes an OR operation between said information read out from said one register and said data related to said immediate data thereof.

* * * * *

UNITED STATES PATENT AND TRADEMARK OFFICE
CERTIFICATE OF CORRECTION

PATENT NO. : 5,269,007
DATED : December 7, 1993
INVENTOR(S) : Makoto Hanawa, et al.

It is certified that error appears in the above-identified patent and that said Letters Patent is hereby corrected as shown below:

Claim 1, column 15, line 68, delete "results" and substitute therefor --result--.

Claim 2, column 16, line 44, delete "field" and substitute therefor --file--.

Claim 4, column 17, line 5, delete ";" and substitute therefor --,--.

Claim 4, column 17, line 22, delete "field" and substitute therefor --file--.

Claim 4, column 18, line 13, delete "field" and substitute therefor --file--.

Claim 4, column 18, line 17, delete "field" and substitute therefor --file--.

Claim 5, column 18, line 24, delete "field" and substitute therefor --file--.

Signed and Sealed this

Twenty-sixth Day of April, 1994

Attest:

BRUCE LEHMAN

*Attesting Officer*  *Commissioner of Patents and Trademarks*